United States Patent
Ruemer et al.

(10) Patent No.: US 12,084,565 B2
(45) Date of Patent: Sep. 10, 2024

(54) COMPOSITION CONTAINING RECYCLED MATERIALS FOR PIPES

(71) Applicant: Borealis AG, Vienna (AT)

(72) Inventors: Franz Ruemer, Linz (AT); Luca Boragno, Linz (AT); Stefan Schiesser, Linz (AT); Guenter Dreiling, Linz (AT); Christian Hollsten, Porvoo (FI); Siegfried Liedauer, Linz (AT); Andrei Ollikainen, Porvoo (FI); Thierry Pezard, Courbevoie (FR)

(73) Assignee: Borealis AG, Vienna (AT)

( * ) Notice: Subject to any disclaimer, the term of this patent is extended or adjusted under 35 U.S.C. 154(b) by 482 days.

(21) Appl. No.: 17/593,630

(22) PCT Filed: Mar. 16, 2020

(86) PCT No.: PCT/EP2020/057079
§ 371 (c)(1),
(2) Date: Sep. 22, 2021

(87) PCT Pub. No.: WO2020/200730
PCT Pub. Date: Oct. 8, 2020

(65) Prior Publication Data
US 2022/0162430 A1 May 26, 2022

(30) Foreign Application Priority Data

Mar. 29, 2019 (EP) .................................. 19166155

(51) Int. Cl.
*C08L 23/12* (2006.01)
(52) U.S. Cl.
CPC ........... *C08L 23/12* (2013.01); *C08L 2203/18* (2013.01); *C08L 2205/03* (2013.01); *C08L 2207/02* (2013.01); *C08L 2207/10* (2013.01); *C08L 2207/20* (2013.01)
(58) Field of Classification Search
None
See application file for complete search history.

(56) References Cited

U.S. PATENT DOCUMENTS

| | | | |
|---|---|---|---|
| 7,767,761 B2 | 8/2010 | Costantini et al. | |
| 2018/0215846 A1* | 8/2018 | Kulshreshtha | C08F 210/16 |
| 2020/0385555 A1* | 12/2020 | Kahlen | C08L 23/10 |

FOREIGN PATENT DOCUMENTS

| | | |
|---|---|---|
| CN | 101341011 A | 1/2009 |
| EP | 0491566 A2 | 6/1992 |
| EP | 586390 A1 | 3/1994 |
| EP | 591224 A1 | 4/1994 |
| EP | 0887379 A1 | 12/1998 |
| EP | 2610271 A1 | 7/2013 |
| EP | 2610272 A1 | 7/2013 |
| EP | 2796501 A1 | 10/2014 |
| EP | 3165473 A1 | 5/2017 |
| WO | 8707620 A1 | 12/1987 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 2004000899 A1 | 12/2003 |
| WO | 2004111095 A1 | 12/2004 |
| WO | 2005014713 A1 | 2/2005 |
| WO | 2007/071494 A1 | 6/2007 |
| WO | 2012007430 A1 | 1/2012 |
| WO | 2015169690 A1 | 11/2015 |
| WO | 2018206353 A1 | 11/2018 |
| WO | WO-2019224129 A1 * | 11/2019 ............. C08L 23/10 |

OTHER PUBLICATIONS

International Search Report and Written Opinion for PCT/EP2020/057079 mailed May 18, 2020, 11 pages.
Busico, et al., "Microstructure of polypropylene, Progress in Polymer Science, vol. 26, 2001, pp. 443-533, Elsevier.ain," Journal of Magnetic Resonance, vol. 176, 2005, pp. 239-243, Elsevier.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Cheng, H.N., "C NMR Analysis of Ethylene-Propylene Rubbers," Macromolecules, 1984, vol. 17, 1984, pp. 1950-1955.
Zweifel, et al., "Plastic Additives Handbook", 6th edition, Hanser Publications, 2009 pp. 1141 to 1190.
Kakugo, et al., "C NMR Determination of Monomer Sequence Distribution in Ethylene-Propylene Copolymers Prepared with s—TiCL13—AL (C2H5)2C1," Macromolecules, 1982, vol. 15, pp. 1150-1152.
Zweifel, et al., "Nucleation of Other Semi-Crystaline Polymers" Plastics Additives Handbook, 5th Edition, 2001, pp. 967-990.
Resconi, et al., "Selectivity in Propene Polymerization with Metallocene Catalysts," Chem. Rev., 2000, vol. 100, pp. 1253-1345.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Office Action for Indian Patent Application No. 202117048681 mailed Sep. 3, 2022, 6 pages.

* cited by examiner

*Primary Examiner* — Richard A Huhn
(74) *Attorney, Agent, or Firm* — Lowenstein Sandler LLP

(57) ABSTRACT

Composition comprising a heterophasic propylene copolymer with low melt flow rate and rather low amount of xylene cold solubles and a recycled polymer composition being rich in polypropylene.

16 Claims, No Drawings

COMPOSITION CONTAINING RECYCLED MATERIALS FOR PIPES

CROSS-REFERENCE TO RELATED APPLICATION(S)

The present application is a national phase of International Application No. PCT/EP2020/057079, filed on Mar. 16, 2020, which claims the benefit of European Patent Application No. 19166155.2, filed on Mar. 29, 2019. The contents of these applications are hereby incorporated by reference in their entirety.

The present invention is directed to a composition comprising a recycled polymer composition (RPC) and a specific heterophasic propylene copolymer (HECO) as compatibilizer as well as to the manufacture of said composition. The present invention is further directed to pipes comprising said composition. Finally the present invention is directed to the use of said specific heterophasic propylene copolymer (HECO) as compatibilizer for the recycled polymer composition (RPC) in a pipe.

Polyolefins, in particular polypropylene, are increasingly consumed in large amounts in a wide range of applications, including packaging for food and other goods, fibres, automotive components, and a great variety of manufactured articles. The reason for this is not only a favorable price/performance ratio, but also the high versatility of these materials and a very broad range of possible modifications, which allows tailoring of end-use properties in a wide range of applications. Chemical modifications, copolymerisation, blending, drawing, thermal treatment and a combination of these techniques can convert common-grade polyolefins into valuable products with desirable properties. This has led to huge amounts of polyolefin materials being produced for consumer applications.

During the last decade, concern about plastics and the environmental sustainability of their use in current quantities has arisen. This has led to new legislation on disposal, collection and recycling of polyolefins. There have, in addition, been efforts in a number of countries to increase the percentage of plastic materials, which are recycled instead of being sent to landfill.

In Europe, plastic waste accounts for approximately 27 million tons of waste a year; of this amount in 2016, 7.4 million tons were disposed of in landfill, 11.27 million tons were burnt (in order to produce energy) and around 8.5 million tons were recycled. Polypropylene based materials are a particular problem as these materials are extensively used in packaging. Taking into account the huge amount of waste collected compared to the amount of waste recycled back into the stream (amounting to only about 30%), there is still a great potential for intelligent reuse of plastic waste streams and for mechanical recycling of plastic wastes.

Nowadays different recycled polymer compositions are already on the market. For instance recycled polymer compositions being polypropylene rich are on the market. One propylene rich recycled polymer composition is for instance the commercial product Dipolen PP from mtm plastics. One major disadvantage of such recycled polymer compositions is that due to the refining process said compositions have a rather low molecular weight, i.e. have a rather high melt flow rate. Accordingly such recycled products are normally not suitable for the production of pipes as for such applications low melt flow rates are required. But not only the melt flow rate of the recycled products is too high to be reused in the technical field of pipes but also the mechanical performance is inadequate. Typically products produced form such recycled polymer compositions tend to suffer from crazes and cracks after a short lifetime. Pipes based on such recycled polymer compositions have further inadmissible slow crack performance. Finally it needs to be mentioned that the thermal stability is rather low expressed by low OIT.

Thus the object of the present invention is to provide a composition which is suitable for pipe applications complying with the standards of pipes, especially in terms of the pipe pressure test as indicated in the example section, even though said composition contains a recycled polymer composition in significant amount.

The finding of the present invention is to provide a composition containing a recycled polymer composition (RPC) which comprises at least 80 wt.-%, based on the weight of the recycled polymer composition (RPC), of a recycled polypropylene, and a heterophasic propylene copolymer (HECO) having a melt flow rate $MFR_2$ (230° C./2.16 kg) measured according to ISO 1133 of not more than 1.5 g/10 min and a moderate amount of xylene cold solubles (XCS), i.e. a xylene cold soluble (XCS) fraction of not more than 18 wt.-%. Preferably said heterophasic propylene copolymer (HECO) is nucleated.

Accordingly the present invention is directed to a composition comprising a recycled polymer composition (RPC), a heterophasic propylene copolymer (HECO) and optional additives (AD), said composition is obtained by blending, preferably by melt mixing, wherein
  (a) the recycled polymer composition (RPC) comprises at least 80 wt.-%, based on the weight of the recycled polymer composition (RPC), of a recycled polypropylene, and
  (b) the heterophasic propylene copolymer (HECO) has
    (b1) a xylene cold soluble (XCS) fraction determined at 25° C. according to ISO 16152 in the range of 5.0 to 18 wt.-%, and
    (b2) a melt flow rate $MFR_2$ (230° C./2.16 kg) measured according to ISO 1133 in the range of 0.05 to 1.5 g/10 min,
  wherein further
  (c) the weight ratio between the heterophasic propylene copolymer (HECO) and the recycled polymer composition (RPC) [(HECO)/(RPC)] is in the range of 1.1 to 7.0, and
  (d) the percentage by weight of the heterophasic propylene copolymer (HECO) together with the recycled polymer composition (RPC) [(HECO)+(RPC)], based on the weight of the composition, is at least 85 wt.-%.

Preferably the heterophasic propylene copolymer (HECO) is alpha-nucleated.

Preferably the recycled polymer composition (RPC) has a content of limonene determined by using solid phase microextraction (HS-SPME-GC-MS) of from 5 to 100 mg/kg.

It is especially preferred that the composition consists of the recycled polymer composition (RPC), the heterophasic propylene copolymer (HECO) and the optional additives (AD).

It is further preferred that the composition has a tensile modulus measured according to ISO 527-2 in the range of 1100 to 1600 MPa and/or a melt flow rate $MFR_2$ (230° C./2.16 kg) measured according to ISO 1133 in the range of 0.05 to 2.0 g/10 min.

Composition according to any one of the preceding claims, wherein the recycled polymer composition (RPC) has a melt flow rate $MFR_2$ (230° C./2.16 kg) measured according to ISO 1133 of at least 8.0 g/10 min.

The invention is also directed to a process for producing the composition as defined above and in more detail below, wherein the heterophasic propylene copolymer (HECO) is (melt) mixed with the recycled polymer composition (RPC)

In another aspect, the present invention is directed to a pipe comprising at least 90 wt.-%, based on the weight of the pipe, of the composition as defined above and in more detail below. Further the invention is also directed to the manufacture of the pipe by (melt) extruding the composition as defined above and in more detail below to a pipe.

Finally the invention is directed to the use of heterophasic propylene copolymer (HECO) as compatibilizer for a recycled polymer composition (RPC) in a pipe, wherein (a) said heterophasic propylene copolymer (HECO) has
(a1) a xylene cold soluble (XCS) fraction determined at 25° C. according to ISO 16152 in the range of 5.0 to 18 wt.-%, and
(a2) a melt flow rate $MFR_2$ (230° C./2.16 kg) measured according to ISO 1133 in the range of 0.05 to 1.5 g/10 min,
and
(b) the recycled polymer composition (RPC) comprises at least 85 wt.-%, based on the weight of the recycled polymer composition (RPC), of a recycled polypropylene, wherein further said heterophasic propylene copolymer (HECO), said recycled polymer composition (RPC) and optional additives (AD) are blended to form a composition being part of the pipe,
wherein still further
(c) the weight ratio between the heterophasic propylene copolymer (HECO) and the recycled polymer composition (RPC) [(HECO)/(RPC)] is in the range of 1.1 to 7.0,
and
(d) the percentage by weight of the heterophasic propylene copolymer (HECO) together with the recycled polymer composition (RPC) [(HECO)+(RPC)], based on the weight of the composition, is at least 85 wt.-%.

Further preferred embodiments of the invention are defined in the claims.

In the following the invention is defined in more detail.

The Composition

The inventive composition must comprise the recycled polymer composition (RPC), the heterophasic propylene copolymer (HECO) and optional additives (AD) wherein the composition is obtained by blending, preferably by melt mixing, the components of the composition. Still more preferably the composition comprising the recycled polymer composition (RPC), the heterophasic propylene copolymer (HECO) and the optional additives (AD) is obtained by melt mixing in an extruder the components of the composition.

The term "blending" according to this invention covers a dry mixing as well as melt mixing, like melt extruding, of substances. In case of melt mixing it is preferred to feed the substances into an extruder either as a dry blend or separately via different feeders. In case of melt mixing the obtained composition is preferably in the form of pellets.

It is possible first to blend, like to melt mix, the recycled polymer composition (RPC) and the heterophasic propylene copolymer (HECO) obtaining thereby a mixture, like pellets in case of melt mixing, and subsequently this mixture, e.g. said pellets, is/are blended, preferably melt mixed, with the other components of the composition, like the additives (AD). However it is preferred to produce the composition in one step, i.e. adding all components in one mixing step. For instance in case of melt mixing the components of the composition may be added via one feeder (the components may have been pre-dry mixed) or the components may be added via different feeders into the extruder obtaining thereby the composition preferably in form of pellets.

Accordingly in case the composition consists of the recycled polymer composition (RPC), the heterophasic propylene copolymer (HECO) and the optional additives (AD), both components or all three components, in case additives (AD) are present, are dry mixed or preferably melt mixed, more preferably melt extruded, obtaining thereby the composition either in form of a dry mixture or in case of melt mixing or melt extruding in form of pellets.

Alternatively first a dry mixture or pellets obtained by melt mixing of the recycled polymer composition (RPC) and the heterophasic propylene copolymer (HECO) is produced and subsequently the inventive composition is obtained by mixing to said dry mixture or to said melted mixture, like the pellets, the additives (AD) in the way of dry mixing or preferably by way of melt mixing, thereby obtaining the composition either in form of a dry blend or as melted mixture, like pellets.

The percentage by weight of the heterophasic propylene copolymer (HECO) together with the recycled polymer composition (RPC) [(HECO)+(RPC)], based on the weight of the composition, is at least 85 wt.-%, preferably at least 90 wt.-%, more preferably at least 95 wt.-%.

It is especially preferred that the inventive composition comprises the recycled polymer composition (RPC), the heterophasic propylene copolymer (HECO) and additives (AD), wherein the percentage by weight of the heterophasic propylene copolymer (HECO) together with the recycled polymer composition (RPC) [(HECO)+(RPC)], based on the weight of the composition, is at least 85 wt.-%, preferably at least 90 wt.-%, more preferably at least 95 wt.-%.

It is especially preferred that the inventive composition consists of the recycled polymer composition (RPC), the heterophasic propylene copolymer (HECO) and optional additives (AD).

Accordingly it is especially preferred that the composition according to this invention consists of (a) at least 80 wt.-%, more preferably at least 85 wt.-%, yet more preferably at least 90 wt.-%, still yet more preferably 95 wt.-%, based on the weight of the composition, of the heterophasic propylene copolymer (HECO) together with the recycled polymer composition (RPC) [(HECO)+(RPC)],
and
(b) the remaining part up to 100 wt.-%, based on the weight of the composition, are additives (AD).

Further on, the weight ratio [(HECO)/(RPC)] between the heterophasic propylene copolymer (HECO) and the recycled polymer composition (RPC) must be in the range of 1.1 to 7.0, preferably in the range of 1.2 to 6.5, more preferably in the range of 1.3 to 6.0, still more preferably in the range of 1.4 to 5.5, most preferably in the range of 1.4 to 5.0.

Accordingly it is preferred that not only the weight ratio between the heterophasic propylene copolymer (HECO) and the recycled polymer composition (RPC) must be considered but also the total amount of both components in the composition of this invention.

Therefore the composition comprising, preferably consisting of, the heterophasic propylene copolymer (HECO), the recycled polymer composition (RPC) and the optional additives (AD) is obtained by blending, preferably melt mixing, like melt extruding,
wherein
(a) the weight ratio between the heterophasic propylene copolymer (HECO) and the recycled polymer composition (RPC) [(HECO)/(RPC)] is in the range of 1.1 to 7.0, preferably in the range of 1.2 to 6.5, and (b) the total weight percentage of the heterophasic propylene copolymer (HECO) together with the recycled polymer composition (RPC) [(HECO)+(RPC)], based on the weight of the composition, is at least 90 wt.-%.

More preferably the composition comprising, preferably consisting of, the heterophasic propylene copolymer (HECO), the recycled polymer composition (RPC) and the optional additives (AD) is obtained by blending, preferably melt mixing, like melt extruding, wherein (a) the weight ratio between the heterophasic propylene copolymer (HECO) and the recycled polymer composition (RPC) [(HECO)/(RPC)] is in the range of 1.1 to 7.0, preferably in the range of 1.2 to 6.5, and (b) the total weight percentage of the heterophasic propylene copolymer (HECO) together with the recycled polymer composition (RPC) [(HECO)+(RPC)], based on the weight of the composition, is at least 95 wt.-%.

Still more preferably the composition consisting of the heterophasic propylene copolymer (HECO), the recycled polymer composition (RPC) and the optional additives (AD) is obtained by blending, preferably melt mixing, like melt extruding, wherein (a) the weight ratio between the heterophasic propylene copolymer (HECO) and the recycled polymer composition (RPC) [(HECO)/(RPC)] is in the range of 1.3 to 6.0, preferably in the range of 1.4 to 5.5, and (b) the total weight percentage of the heterophasic propylene copolymer (HECO) together with the recycled polymer composition (RPC) [(HECO)+(RPC)], based on the weight of the composition, is at least 95 wt.-% and the remaining part up to 100 wt.-%, based on the weight of the composition, are additives (AD).

Preferably the composition of this invention has a melt flow rate $MFR_2$ (230° C./2.16 kg) measured according to ISO 1133 in the range of 0.05 to 2.0 g/10 min, more preferably in the range of 0.2 to 1.5 g/10 min.

In addition it is preferred that the composition of this invention has tensile modulus measured according to ISO 527-2 in the range of 1100 to 1900 MPa, more preferably in the range of 1300 to 1700 MPa, yet more preferably in the range of 1100 to 1600 MPa.

In a preferred embodiment, the composition has a content of limonene as determined using solid phase microextraction (HS-SPME-GC-MS) of from 0.5 to 40 mg/kg, preferably from 0.8 to 30 mg/kg, more preferably from 1.0 to 25 mg/kg, most preferably from 1.5 to 20 mg/kg. Limonene is conventionally found in recycled polyolefin materials and originates from packing application in the field of cosmetics, detergents, shampoos and similar products. Accordingly due to the presence of the recycled polymer composition (RPC) in the composition, the composition may also contain detectable amounts of limonene.

The Recycled Polymer Composition (RPC)

The recycled polymer composition (RPC) of this invention must be polypropylene rich.

For the purposes of the present invention, the term "recycled polymer composition (RPC)" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

The term "virgin" denotes the newly produced materials and/or objects prior to their first use, which have not already been recycled. For instance, the heterophasic propylene copolymer (HECO) according to this invention is a virgin material. Many different kinds of recycled polypropylene and but also many different kinds of recycled polyethylene can be present in "recycled polymer composition (RPC)". In particular, the polypropylene fraction can comprise: isotactic propylene homopolymers, random copolymers of propylene with ethylene and/or $C_4$-$C_8$ α-olefins, heterophasic copolymers and mixtures thereof.

Preferably, the polypropylene-rich recycled polymer composition (RPC) of this invention is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), mtm Plastics GmbH (DE) etc. One none exhaustive example of the polypropylene rich recycled polymer composition (RPC) is DIPOLEN PP (mtm Plastics GmbH). It is considered that the present invention could be applicable to a broad range of recycled polypropylene-rich materials or materials or compositions having a high content of recycled polypropylene. The polypropylene-rich recycled polymer composition (RPC) may be in the form of pellets.

As mentioned above the recycled polymer composition (RCP) according to this invention is polypropylene rich, i.e. the major amount of the recycled polymer composition (RCP) is recycled polypropylene. Accordingly, the recycled polymer composition (RCP) comprises at least 80 wt.-%, preferably at least 83 wt.-%, more preferably at least 85 wt.-%, based on the weight of the recycled polymer composition (RCP), of recycled polypropylene.

The remaining part up to 100 wt.-%, based on the recycled polymer composition (RCP), can be other recycled polymers, like recycled polyethylene, recycled polystyrene and recycled polyamide, but also inorganic residues, like talk or chalk. However the by far main part of the recycled polymer composition (RCP) are recycled polymers. Thus the amount of recycled polymers, including recycled polypropylene, is at least 90 wt.-%, more preferably at least 93 wt.-%, still more preferably at least 95 wt.-%, based on the weight of the recycled polymer composition (RCP). Still more preferably the amount of recycled polymers selected from the group consisting of recycled polypropylene, recycled polyethylene, recycled polystyrene, recycled polyamide and mixtures thereof, is at least 90 wt.-%, more preferably at least 93 wt.-%, still more preferably at least 95 wt.-%, based on the weight of the recycled polymer composition (RCP), with the proviso that the amount of recycled polypropylene is at least 80 wt.-%, more preferably at least 83 wt.-%, more preferably at least 85 wt.-%, based on the weight of the recycled polymer composition (RCP).

Accordingly in one preferred embodiment the recycled polymer composition (RPC) comprises recycled polypropylene, and in minor amounts of at least one recycled polymer selected from the group consisting of recycled polyethylene, recycled polystyrene, recycled polyamide and mixtures thereof, and at least one inorganic compound selected from the group consisting of talc, chalk and mixtures thereof, with the proviso that the amounts are as follows:
(a) 80 to 96 wt.-%, more preferably 83 to 95 wt.-%, still more preferably 85 to 94 wt.-%, based on the weight of the recycled polymer composition (RPC), of recycled polypropylene;
(b) not more than 15.0 wt.-%, more preferably not more than 12.0 wt.-%, still more preferably not more than 10.0 wt.-%, based on the weight of the recycled polymer composition (RPC), of recycled polyethylene;
(c) not more than 8.00 wt.-%, more preferably not more than 7.0 wt.-%, still more preferably not more than 6.0 wt.-%, based on the weight of the recycled polymer composition (RPC), of recycled polystyrene;
(d) not more than 1.50 wt.-%, more preferably not more than 1.30, still more preferably not more than 1.0 wt.-%, based on the weight of the recycled polymer composition (RPC), of recycled polyamide;
(e) not more than 2.50 wt.-%, more preferably not more than 2.20 wt.-%, still more preferably not more than 2.0 wt.-%, based on the weight of the recycled polymer composition (RPC), of inorganic components selected from the group consisting of talc, chalk and mixtures thereof.

Accordingly in one more preferred embodiment the recycled polymer composition (RPC) comprises recycled polypropylene, and in minor amounts of recycled polyethylene, recycled polystyrene, recycled polyamide and inorganic compounds selected from the group consisting of talc, chalk and mixtures thereof,
with the proviso that the amounts are as follows:
(a) 80 to 96 wt.-%, more preferably 83 to 95 wt.-%, still more preferably 85 to 94 wt.-%, based on the weight of the recycled polymer composition (RPC), of recycled polypropylene;
(b) not more than 15.0 wt.-%, more preferably not more than 12.0 wt.-%, still more preferably not more than 10.0 wt.-%, based on the weight of the recycled polymer composition (RPC), of recycled polyethylene;
(c) not more than 8.00 wt.-%, more preferably not more than 7.0 wt.-%, still more preferably not more than 6.0 wt.-%, based on the weight of the recycled polymer composition (RPC), of recycled polystyrene;
(d) not more than 1.50 wt.-%, more preferably not more than 1.30, still more preferably not more than 1.0 wt.-%, based on the weight of the recycled polymer composition (RPC), of recycled polyamide;
(e) not more than 2.50 wt.-%, more preferably not more than 2.20 wt.-%, still more preferably not more than 2.0 wt.-%, based on the weight of the recycled polymer composition (RPC), of inorganic components selected from the group consisting of talc, chalk and mixtures thereof.

Accordingly in one specific preferred embodiment the recycled polymer composition (RPC) comprises recycled polypropylene, and in minor amounts of recycled polyethylene, recycled polystyrene, recycled polyamide and inorganic compounds selected from the group consisting of talc, chalk and mixtures thereof,
with the proviso that the amounts are as follows:
(a) 80 to 96 wt.-%, more preferably 83 to 95 wt.-%, still more preferably 85 to 94 wt.-%, based on the weight of the recycled polymer composition (RPC), of recycled polypropylene,
(b) more than 0.05 to 15.0 wt.-%, more preferably 1.0 to 12.0 wt.-%, still more preferably 3.0 to 10.0 wt.-%, based on the weight of the recycled polymer composition (RPC), of recycled polyethylene;
(c) more than 0.05 to 8.00 wt.-%, more preferably 0.1 to 7.0 wt.-%, still more preferably 0.5 to 6.0 wt.-%, based on the weight of the recycled polymer composition (RPC), of recycled polystyrene;
(d) more than 0.05 to 1.50 wt.-%, more preferably 0.08 to 1.30, still more preferably 0.1 to 1.0 wt.-%, based on the weight of the recycled polymer composition (RPC), of recycled polyamide,
(e) 0.05 to 2.50 wt.-%, more preferably 0.1 to 2.20 wt.-%, still more preferably 0.5 to 2.0 wt.-%, based on the weight of the recycled polymer composition (RPC), of inorganic components selected from the group consisting of talc, chalk and mixtures thereof.

It is preferred that the recycled polymer composition (RPC) has a melt flow rate $MFR_2$ (230° C./2.16 kg) measured according to ISO 1133 of at least 8.0 g/10 min, more preferably in the range of 8.0 to 50 g/10 min, still more preferably in the range of 10.0 to 20.0 g/10 min.

According to the present invention, the recycled polymer composition (RPC) preferably has a content of limonene as determined using solid phase microextraction (HS-SPME-GC-MS) of from 5 to 100 mg/kg, preferably from 5 to 80 mg/kg, more preferably from 5 to 60 mg/kg, most preferably from 5.5 to 50 mg/kg. Limonene is conventionally found in recycled polyolefin materials and originates from packing application in the field of cosmetics, detergents, shampoos and similar products. Therefore, the recycled polymer composition (RPC) according to this invention contains limonene, when the composition contains material that originates from domestic waste streams.

The fatty acid content is yet another indication of the recycling origin of the recycled polymer composition (RPC). According to the present invention, the recycled polymer composition (RPC) preferably has a total content of fatty acids as determined using solid phase microextraction (HS-SPME-GC-MS) of greater than 0 but not more than 200 mg/kg, preferably in the range of 20 to 200 mg/kg, more preferably in the range of 20 to 100 mg/kg, most preferably in the range of 20 to 50 mg/kg.

The Heterophasic Propylene Copolymer (HECO)

As discussed above recycled polyolefin materials, like the recycled polymer composition (RCP), generally contain a mixture of recycled polypropylene, recycled polyethylene and optionally other recycled polymers, like recycled polystyrene and/or recycled polyamide. Unfortunately, polypropylene and polyethylene are highly immiscible resulting in a blend with poor adhesion among its phases, coarse morphology and consequently poor mechanical properties. A further drawback of recycled polymer compositions, like the recycled polymer composition (RCP), is their rather high melt flow rate due to degradation during the recycling process.

Accordingly, there is the need of further components to make such recycled polyolefin materials applicable for specific applications, like in the present case applicable for pipe applications. Such further composition may act as a compatibilizer, i.e. making the different components miscible.

In the present case the heterophasic propylene copolymer (HECO) acts as a compatibilizer. According to the present invention a compatibilizer is understood as a component making the recycled polymer composition (RCP) applicable for the pipe manufacture. Thus the term compatibilizer is understood in a more specific way. That is the heterophasic propylene copolymer (HECO) does not only improve the miscibility of the components present in the composition according to this invention, but also reduces the total melt flow rate as well as improves mechanical properties especially in terms of tensile modulus and impact strength at 23° C. That is the heterophasic propylene copolymer (HECO) as a compatibilizer makes it possible to produce pipes containing the recycled polymer composition (RCP) in an amount of at least 10 wt.-%, based on the weight of the pipe, and nevertheless the pipe complies with the standard requirements. The standard requirements according to this invention are
  (a) impact resistance (staircase method) according to EN 1411: 1996 (−10° C./4 kg) of at least 1 m, and
  (b) resistance to internal pressure according to ISO 1167 (95° C./2.5 MPa) of at least 900 hrs, preferably of at least 1000 hrs.

A heterophasic propylene copolymer comprises a matrix being a (semicrystalline) polypropylene and an elastomeric propylene copolymer. The expression "heterophasic propylene copolymer" or "heterophasic" as used in the present invention indicates that the elastomeric propylene copolymer is (finely) dispersed in the (semicrystalline) polypropylene. In other words, the (semicrystalline) polypropylene constitutes a matrix in which the elastomeric propylene copolymer forms inclusions in the matrix, i.e. in the (semicrystalline) polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic propylene copolymer (HECO), said inclusions are for instance visible by high resolution microscopy, like electron microscopy or atomic force microscopy, or by dynamic mechanical thermal analysis (DMT A). Specifically, in DMTA the presence of a multiphase structure can be identified by the presence of at least two distinct glass transition temperatures.

The heterophasic propylene copolymer (HECO) according to this invention has a rather high molecular weight and rather low amount of rubber, i.e. of the elastomeric propylene copolymer. Typically the xylene cold soluble fraction is equivalent with the amount of elastomeric propylene copolymer. Accordingly the heterophasic propylene copolymer (HECO) according to this invention has
  (a) a melt flow rate $MFR_2$ (230° C./2.16 kg) measured according to ISO 1133 in the range of 0.05 to 1.5 g/10 min, preferably in the range of 0.05 to 1.0 g/10 min, more preferably in the range of 0.10 to 0.80 g/10 min; and
  (b) a xylene cold soluble (XCS) fraction determined at 25° C. according to ISO 16152 in the range of 5.0 to 18 wt.-%, preferably in the range of 7.0 to 16 wt.-%, more preferably in the range of 9.0 to 15 wt.-%.

Preferably the heterophasic propylene copolymer (HECO) has a comonomer content, preferably a content of ethylene and/or $C_4$ to $C_{12}$ a-olefin, more preferably an ethylene content, determined by $^{13}$C-NMR spectroscopy in the range 2.5 to 10.0 wt.-%, more preferably in the range of 3.0 to 8.0 wt.-%, still more preferably in the range of 3.5 to 6.5 wt.-%, based on the heterophasic propylene copolymer (HECO).

It is especially preferred that the heterophasic propylene copolymer (HECO) contains only propylene and ethylene derived units, wherein the ethylene content determined by $^{13}$C-NMR spectroscopy is in the range 2.5 to 10.0 wt.-%, more preferably in the range of 3.0 to 8.0 wt.-%, still more preferably in the range of 3.5 to 6.5 wt.-%.

It is further preferred that the comonomer content, preferably the content of ethylene and/or $C_4$ to $C_{12}$ a-olefin, more preferably the content of ethylene, of the xylene cold soluble (XCS) fraction of the heterophasic propylene copolymer (HECO) is in the range of 28 to 38 wt.-%, more preferably in the range of 29 to 37 wt.-%, still more preferably in the range of 30 to 36 wt.-%.

It is especially preferred that the heterophasic propylene copolymer (HECO) contains only propylene and ethylene derived units, wherein the ethylene content determined by $^{13}$C-NMR spectroscopy of the xylene cold soluble (XCS) of the heterophasic propylene copolymer (HECO) is in the range of 28 to 38 wt.-%, more preferably in the range of 29 to 37 wt.-%, still more preferably in the range of 30 to 36 wt.-%.

It is further preferred that the xylene cold soluble (XCS) of the heterophasic propylene copolymer (HECO) has a rather high intrinsic viscosity. Accordingly the intrinsic viscosity of the xylene cold soluble (XCS) fraction of the heterophasic propylene copolymer (HECO) preferably is in the range of 2.9 to 4.5 dl/g, more preferably in the range of 3.0 to 4.2 dl/g, yet more preferably in the range 3.2 to 3.8 dl/g.

The heterophasic propylene copolymer (HECO) comprises a matrix being a (semicrystalline) polypropylene (PP) and an elastomeric propylene copolymer (EPC).

The (semicrystalline) polypropylene (PP) is preferably a (semicrystalline) random propylene copolymer (R-PP) or a (semicrystalline) propylene homopolymer (H-PP), the latter especially preferred.

The expression "propylene homopolymer" used in the instant invention relates to a polypropylene that consists substantially, i.e. of more than 99.5 wt.-%, still more preferably of at least 99.7 wt.-%, of propylene units. In a preferred embodiment only propylene units in the propylene homopolymer are detectable.

In case the (semicrystalline) polypropylene (PP) is a (semicrystalline) random propylene copolymer (R-PP) it is preferred that the (semicrystalline) random propylene copolymer (R-PP) comprises monomers co-polymerizable with propylene, for example co-monomers such as ethylene and/or $C_4$ to $C_{12}$ alpha-olefins, in particular ethylene and/or $C_4$ to $C_8$ alpha-olefins, e.g. 1-butene and/or 1-hexene. Preferably the (semicrystalline) random propylene copolymer (R-PP) according to this invention comprises, especially consists of, monomers co-polymerizable with propylene from the group consisting of ethylene, 1-butene and 1-hexene. More specifically the (semicrystalline) random propylene copolymer (R-PP) of this invention comprises—apart from propylene—units derivable from ethylene and/or 1-butene. In a preferred embodiment the (semicrystalline) random propylene copolymer (R-PP) comprises units derivable from propylene and ethylene only.

Additionally, it is preferred that the (semicrystalline) random propylene copolymer (R-PP) has a co-monomer content, more preferably ethylene content, in the range of more than 0.6 to 5.0 wt.-%, more preferably in the range of more than 0.6 to 4.0 wt.-%, yet more preferably in the range of 0.6 to 3.0 wt.-%.

The term "random" indicates that the co-monomers of the (semicrystalline) random propylene copolymers (R-PP) are randomly distributed within the propylene copolymer. The term random is understood according to IUPAC (Glossary of basic terms in polymer science; IUPAC recommendations 1996).

As will be explained below, the heterophasic propylene copolymer (HECO) can be produced by blending the (semicrystalline) polypropylene (PP) and the elastomeric propylene copolymer (EPC). However, it is preferred that the heterophasic propylene copolymer (HECO) is produced in a sequential polymerization process, using reactors in serial configuration and operating at different reaction conditions. Typically, the (semicrystalline) polypropylene (PP) is produced in at least one first reactor, preferably two reactors, and subsequently the elastomeric propylene copolymer (EPC) in at least one second reactor.

Further it is preferred that the (semicrystalline) polypropylene (PP), like (semicrystalline) propylene homopolymer (H-PP), of the heterophasic propylene copolymer (HECO) has a low melt flow $MFR_2$ (230° C./2.16 kg). Thus it is preferred that the (semicrystalline) polypropylene (PP), like (semicrystalline) propylene homopolymer (H-PP), of the heterophasic propylene copolymer (HECO) has a melt flow rate $MFR_2$ (230° C./2.16 kg) measured according to ISO 1133 in the range of 0.05 to 2.0 g/10 min, more preferably in the range of 0.05 to 1.5 g/10 min, yet more preferably in the range of 0.10 to 1.0 g/10 min.

Accordingly, it is preferred that the heterophasic propylene copolymer (HECO) comprises a semicrystalline propylene homopolymer (PPH) as matrix in which a propylene-ethylene rubber as elastomeric propylene copolymer (EPC) is dispersed, wherein the semicrystalline propylene homopolymer (PPH) preferably has a melt flow rate $MFR_2$ (230° C./2.16 kg) measured according to ISO 1133 in the range of 0.05 to 2.0 g/10 min, more preferably in the range of 0.05 to 1.5 g/10 min, yet more preferably in the range of 0.10 to 1.0 g/10 min.

The term "semicrystalline" indicates that the polymer is not amorphous. Accordingly, it is preferred that the semicrystalline polypropylene (PP) according to this invention has a xylene soluble fraction (XCS) of not more than 8 wt.-%, in case of a (semicrystalline) propylene homopolymer (H-PP) the xylene soluble fraction (XCS) is even lower, i.e. not more than 5.0 wt.-%, more preferably not more than 4.0 wt.-%.

Accordingly, it is preferred that the (semicrystalline) propylene homopolymer (H-PP) has a xylene soluble fraction (XCS) of below 5.0 wt.-%, more preferably in the range of 0.5 to 4.5 wt.-%, like in the range of 0.5 to 3.5 wt.-%.

Preferably the (semicrystalline) polypropylene (PP) according to this invention has a melting temperature Tm above 135° C., more preferably above 140° C. In case of the (semicrystalline) propylene homopolymer (H-PP) the melting temperature Tm is above 150° C., like at least 156° C. Upper ranges are not more than 168° C., like not more than 167° C.

Preferably the (semicrystalline) polypropylene (PP) comprises two (semicrystalline) polypropylene fractions (PP1) and (PP2) which differ in the molecular weight. Accordingly it is preferred that the (semicrystalline) polypropylene (PP) comprises two (semicrystalline) polypropylene fractions (PP1) and (PP2), wherein (a) the percentage by weight of the two (semicrystalline) polypropylene fractions (PP1) and (PP2) together ((PP1)+(PP2)), based on the weight of the (semicrystalline) polypropylene (PP), is at least 90 wt.-%, more preferably at least 95 wt.-%, yet more preferably at least 98 wt.-%, and (b) weight ratio between the (semicrystalline) polypropylene fractions (PP1) and (PP2) ((PP1)/(PP2)) is in the range of 0.8 to 1.4, more preferably in the range of 0.9 to 1.3, wherein further (c) the (semicrystalline) polypropylene fraction (PP1) has a melt flow rate $MFR_2$ (230° C./2.16 kg) measured according to ISO 1133 in the range of 0.01 to 1.0 g/10 min, more preferably in the range of 0.02 to 0.8 g/10 min, yet more preferably in the range of 0.02 to 0.10 g/10 min, and (d) the (semicrystalline) polypropylene (PP) has a melt flow rate $MFR_2$ (230° C./2.16 kg) measured according to ISO 1133 in the range of 0.05 to 2.0 g/10 min, more preferably in the range of 0.05 to 1.5 g/10 min, yet more preferably in the range of 0.10 to 1.0 g/10 min;

preferably with the proviso that the melt flow rate $MFR_2$ ratio of the (semicrystalline) polypropylene (PP) to the (semicrystalline) polypropylene fraction (PP1) ($MFR_2$ (PP)/$MFR_2$(PP1)) is at least 3, more preferably in the range of 3 to 10, yet more preferably in the range of 4 to 8.

Preferably the (semicrystalline) polypropylene fractions (PP1) and (PP2) are semicrystalline propylene homopolymer fractions (PPH1) and (PPH2) and the (semicrystalline) polypropylene (PP) is semicrystalline propylene homopolymer (PPH).

The second component of the heterophasic propylene copolymer (HECO) is the elastomeric propylene copolymer (EPC).

Preferably said elastomeric propylene copolymer (EPC) comprises units derived from propylene and ethylene and/or $C_4$ to $C_{12}$ alpha-olefin.

The elastomeric propylene copolymer (EPC) comprises, preferably consists of, units derivable from (i) propylene and (ii) ethylene and/or at least another $C_4$ to $C_{12}$ alpha-olefin, like $C_4$ to $C_{10}$ alpha-olefin, more preferably units derivable from (i) propylene and (ii) ethylene and/or at least another alpha-olefin selected form the group consisting of 1-butene, 1-pentene, 1-hexene, 1-heptene and 1-octene.

Accordingly, the elastomeric propylene copolymer (EPC) preferably comprises at least units derivable from propylene and ethylene and may comprise other units derivable from a further alpha-olefin as defined in the previous paragraph. However, it is in particular preferred that elastomeric propylene copolymer (EPC) comprises units only derivable from propylene and ethylene. Thus it is especially preferred that the elastomeric propylene copolymer (EPC) is an ethylene propylene rubber (EPR).

In the present invention the content of units derivable from monomer units other than propylene, especially ethylene, in the elastomeric propylene copolymer (EPC) equates largely with the content of units derivable from monomer units other than propylene, especially ethylene, detectable in the xylene cold soluble (XCS) fraction. Accordingly, the ethylene and/or $C_4$ to $C_{12}$ alpha-olefin content, like the ethylene content, of the elastomeric propylene copolymer (EPC) is in the range of 28 to 38 wt.-%, more preferably in the range of 29 to 37 wt.-%, still more preferably in the range of 30 to 36 wt.-%. It is especially preferred that the elastomeric propylene copolymer (EPC) is a propylene-ethylene rubber (EPR) having an ethylene content in the range of 28 to 38 wt.-%, more preferably in the range of 29 to 37 wt.-%, still more preferably in the range of 30 to 36 wt.-%.

The heterophasic propylene copolymer (HECO) can contain typical additives known in the art, like antioxidants or process additives. It is especially preferred that the heterophasic propylene copolymer (HECO) is alpha-nucleated, i.e. contains an alpha-nucleating agent.

The alpha-nucleating agent is preferably selected from the group consisting of (i) salts of monocarboxylic acids and polycarboxylic acids, e.g. sodium benzoate or aluminum tert-butylbenzoate, and (ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O[(4-propylphenyl)methylene]-nonitol, and (iii) salts of diesters of phosphoric acid, e.g. sodium 2,2'-methylenebis (4,6-di-tert-butylphenyl) phosphate or aluminum-hydroxy-bis[2,2'-methylene-bis(4,6-di-t-butylphenyl)phosphate], and (iv) vinylcycloalkane polymer or vinylalkane polymer, and (v) mixtures thereof.

Preferably the alpha-nucleating agent comprised in the heterophasic propylene copolymer (HECO) is vinylcycloalkane polymer and/or vinylalkane polymer, more preferably vinylcycloalkane polymer, like vinylcyclohexane (VCH) polymer. Vinyl cyclohexane (VCH) polymer is particularly preferred as alpha-nucleating agent. It is preferred that the amount of vinylcycloalkane, like vinylcyclohexane (VCH), polymer and/or vinylalkane polymer, more preferably of vinylcyclohexane (VCH) polymer, in the heterophasic propylene copolymer (HECO) is not more than 500 ppm, preferably not more than 200 ppm, more preferably not more than 100 ppm, like in the range of 0.1 to 500 ppm, preferably in the range of 0.5 to 200 ppm. Furthermore, it is appreciated that the vinylcycloalkane polymer and/or vinylalkane polymer is introduced into the composition by the BNT technology as described in more detail below.

Such nucleating agents are commercially available and are described, for example, in "Plastic Additives Handbook", 5th edition, 2001 of Hans Zweifel (pages 967 to 990).

As mentioned above the heterophasic propylene copolymer (HECO) can be produced by blending the (semicrystalline) polypropylene (PP) and the elastomeric propylene copolymer (EPC). However, it is preferred that the heterophasic propylene copolymer (HECO) is produced in a sequential step process, using reactors in serial configuration and operating at different reaction conditions. As a consequence, each fraction prepared in a specific reactor may have its own molecular weight distribution and/or comonomer content distribution. The heterophasic propylene copolymer (HECO) according to this invention is preferably produced in a sequential polymerization process, i.e. in a multistage process, known in the art, wherein the (semicrystalline) polypropylene (PP) is produced at least in one slurry reactor, preferably in a slurry reactor and optionally in a subsequent gas phase reactor, and subsequently the elastomeric propylene copolymer (EPC) is produced at least in one, i.e. one or two, gas phase reactor(s).

Accordingly, it is preferred that the heterophasic propylene copolymer (HECO) is produced in a sequential polymerization process comprising the steps of (a) polymerizing propylene and optionally at least one ethylene and/or $C_4$ to $C_{12}$ alpha-olefin, preferably polymerizing only propylene, in a first reactor (R1) obtaining the first polypropylene fraction (PP1) of the (semicrystalline) polypropylene (PP), preferably said first polypropylene fraction (PP1) is a propylene homopolymer fraction (PPH1), (b) transferring the first polypropylene fraction (PP1), like the propylene homopolymer fraction (PPH1), into a second reactor (R2), (c) polymerizing in the second reactor (R2) and in the presence of said first polypropylene fraction (PP1), like the propylene homopolymer fraction (PPH1), propylene and optionally at least one ethylene and/or $C_4$ to $C_{12}$ alpha-olefin, preferably polymerizing only propylene, obtaining thereby the second polypropylene fraction (PP1), preferably said second polypropylene fraction (PP2) is a second propylene homopolymer fraction (PPH2), said first polypropylene fraction (PP1) and said second polypropylene fraction (PP2) form the (semicrystalline) polypropylene (PP), preferably the propylene homopolymer (HPP), i.e. the matrix of the heterophasic propylene copolymer (HECO), (d) transferring the (semicrystalline) polypropylene (PP), like the propylene homopolymer (HPP), of step (c) into a third reactor (R3), (e) polymerizing in the third reactor (R3) and in the presence of the (semicrystalline) polypropylene (PP), like the propylene homopolymer (HPP), obtained in step (c) propylene and at least one ethylene and/or $C_4$ to $C_{12}$ alpha-olefin obtaining thereby the elastomeric propylene copolymer (EPC); the elastomeric propylene copolymer (EPC) is dispersed in the (semicrystalline) polypropylene (PP), like the propylene homopolymer (HPP); the (semicrystalline) polypropylene (PP) and the elastomeric propylene copolymer (EPC) form the heterophasic propylene copolymer (HECO).

Of course, in the first reactor (R1) the second polypropylene fraction (PP2) can be produced and in the second reactor (R2) the first polypropylene fraction (PP1) can be obtained. Preferably between the second reactor (R2) and the third reactor (R3) the monomers are flashed out.

The term "sequential polymerization process" indicates that the heterophasic propylene copolymer (HECO) is produced in at least two, like three, reactors connected in series. Accordingly, the present process comprises at least a first reactor (R1) and a second reactor (R2), more preferably a first reactor (R1), a second reactor (R2) and a third reactor (R3). The term "polymerization reactor" shall indicate that the main polymerization takes place. Thus in case the process consists of three polymerization reactors, this definition does not exclude the option that the overall process comprises for instance a pre-polymerization step in a pre-polymerization reactor. The term "consist of" is only a closing formulation in view of the main polymerization reactors.

The first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) can be a slurry reactor, like a loop reactor, as the first reactor or alternatively a gas phase reactor (GPR).

The third reactor (R3) is preferably a gas phase reactor (GPR).

Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactors are fluidized bed type reactors preferably with a mechanical stirrer.

Thus in a preferred embodiment the first reactor (R1) is a slurry reactor (SR), like a loop reactor (LR), whereas the second reactor (R2) and the third reactor (R3) are gas phase reactors (GPR). Accordingly, for the instant process at least three, preferably three polymerization reactors, namely a slurry reactor (SR), like a loop reactor (LR), a first gas phase reactor (GPR-1) and a second gas phase reactor (GPR-2) connected in series are used. If needed prior to the slurry reactor (SR) a pre-polymerization reactor is placed.

In another preferred embodiment the first reactor (R1) and second reactor (R2) are slurry reactors (SR), like loop reactors (LR), whereas the third reactor (R3) is a gas phase reactor (GPR). Accordingly, for the instant process at least three, preferably three polymerization reactors, namely two slurry reactors (SR), like two loop reactors (LR) and a gas phase reactor (GPR-1) connected in series are used. If needed prior to the first slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the heterophasic propylene copolymer (HECO) as defined above the conditions for the first reactor (R1), i.e. the slurry reactor (SR), like a loop reactor (LR), of step (a) may be as follows:
 the temperature is within the range of 50° C. to 110° C., preferably between 60° C. and 100° C., more preferably between 68 and 95° C.,
 the pressure is within the range of 20 bar to 80 bar, preferably between 40 bar to 70 bar,
 Hydrogen can be added for controlling the molar mass in a manner known per se.

Subsequently, the reaction mixture from step (a) is transferred to the second reactor (R2), i.e. gas phase reactor (GPR-1), i.e. to step (c), whereby the conditions in step (c) are preferably as follows:
 the temperature is within the range of 50° C. to 130° C., preferably between 60° C. and 100° C.,
 the pressure is within the range of 5 bar to 50 bar, preferably between 15 bar to 35 bar.
 Hydrogen can be added for controlling the molar mass in a manner known per se.

The condition in the third reactor (R3), preferably in the second gas phase reactor (GPR-2), is similar to the second reactor (R2).

The residence time can vary in the three reactor zones.

In one embodiment of the process the heterophasic propylene copolymer (HECO) the residence time in bulk reactor, e.g. loop is in the range 0.1 to 2.5 hours, e.g. 0.15 to 1.5 hours and the residence time in gas phase reactors will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 10 to 60° C., preferably from 15 to 50° C., and more preferably from 20 to 45° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step.

However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a multistage polymerization process, as described above, in the presence of a catalyst system comprising as component (i) a Ziegler-Natta procatalyst which contains a trans-esterification product of a lower alcohol and a phthalic ester.

The procatalyst may be a "non-phthalic" Ziegler-Natta procatalyst or a "phthalic" Ziegler-Nana procatalyst. First the "non-phthalic" Ziegler-Natta procatalyst is described, subsequently the phthalic" Ziegler-Natta procatalyst.

The "non-phthalic" Ziegler-Natta procatalyst comprises compounds (TC) of a transition metal of Group 4 to 6 of IUPAC, like titanium, a Group 2 metal compound (MC), like a magnesium, and an internal donor (ID) being a non-phthalic compound, preferably a non-phthalic acid ester, still more preferably being a diester of non-phthalic dicarboxylic acids as described in more detail below. Thus, the "non-phthalic" Ziegler-Natta procatalyst is fully free of undesired phthalic compounds. Further, the "non-phthalic" Ziegler-Natta procatalyst is free of any external support material, like silica or $MgCl_2$, but the catalyst is self-supported.

The "non-phthalic" Ziegler-Natta procatalyst can be further defined by the way as obtained. Accordingly, the "non-phthalic" Ziegler-Natta procatalyst is preferably obtained by a process comprising the steps of
 a)
  $a_1$) providing a solution of at least a Group 2 metal alkoxy compound (Ax) being the reaction product of a Group 2 metal compound (MC) and an alcohol (A) comprising in addition to the hydroxyl moiety at least one ether moiety optionally in an organic liquid reaction medium;
  or
  $a_2$) a solution of at least a Group 2 metal alkoxy compound (Ax') being the reaction product of a Group 2 metal compound (MC) and an alcohol mixture of the alcohol (A) and a monohydric alcohol (B) of formula ROH, optionally in an organic liquid reaction medium;
  or
  $a_3$) providing a solution of a mixture of the Group 2 alkoxy compound (Ax) and a Group 2 metal alkoxy compound (Bx) being the reaction product of a Group 2 metal compound (MC) and the monohydric alcohol (B), optionally in an organic liquid reaction medium; and b) adding said solution from step a) to at least one compound (TC) of a transition metal of Group 4 to 6 and c) obtaining the solid catalyst component particles, and adding a non-phthalic internal electron donor (ID) at any step prior to step c).

The internal donor (ID) or precursor thereof is added preferably to the solution of step a).

According to the procedure above the "non-phthalic" Ziegler-Natta procatalyst can be obtained via precipitation method or via emulsion (liquid/liquid two-phase system)—solidification method depending on the physical conditions, especially temperature used in steps b) and c).

In both methods (precipitation or emulsion-solidification) the catalyst chemistry is the same.

In precipitation method combination of the solution of step a) with at least one transition metal compound (TC) in step b) is carried out and the whole reaction mixture is kept at least at 50° C., more preferably in the temperature range of 55 to 110° C., more preferably in the range of 70 to 100° C., to secure full precipitation of the catalyst component in form of solid particles (step c).

In emulsion-solidification method in step b) the solution of step a) is typically added to the at least one transition metal compound (TC) at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active "non-phthalic" Ziegler-Natta procatalyst composition. Solidification (step c) of the droplets is suitably carried out by heating the emulsion to a temperature of 70 to 150° C., preferably to 80 to 110° C.

The "non-phthalic" Ziegler-Natta procatalyst prepared by emulsion-solidification method is preferably used in the present invention.

In a preferred embodiment in step a) the solution of $a_2$) or $a_3$) are used, i.e. a solution of (Ax') or a solution of a mixture of (Ax) and (Bx).

Preferably the Group 2 metal (MC) is magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds and used as such in the catalyst preparation process of the invention.

Illustrative examples of alcohols (A) are monoethers of dihydric alcohols (glycol monoethers). Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred.

Illustrative monohydric alcohols (B) are of formula ROH, with R being straight-chain or branched $C_6$-$C_{10}$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 8:1 to 2:1, more preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Alkyl groups can be a similar or different $C_1$-$C_{20}$ alkyl, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula R" $(OH)_m$ to obtain said magnesium alkoxide compounds. Preferred polyhydric alcohols, if used, are alcohols, wherein R" is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition, a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particular preferred.

Mg compound is typically provided as a 10 to 50 wt-% solution in a solvent as indicated above. Typical commercially available Mg compound, especially dialkyl magnesium solutions are 20-40 wt-% solutions in toluene or heptanes.

The reaction for the preparation of the magnesium alkoxy compound may be carried out at a temperature of 40° to 70° C. Most suitable temperature is selected depending on the Mg compound and alcohol(s) used.

The transition metal compound of Group 4 to 6 is preferably a titanium compound, most preferably a titanium halide, like $TiCl_4$.

The internal donor (ID) used in the preparation of the catalyst used in the present invention is preferably selected from (di)esters of non-phthalic carboxylic (di)acids, 1,3-diethers, derivatives and mixtures thereof. Especially preferred donors are diesters of mono-unsaturated dicarboxylic acids, in particular esters belonging to a group comprising malonates, maleates, succinates, citraconates, glutarates, cyclohexene-1,2-dicarboxylates and benzoates, and any derivatives and/or mixtures thereof. Preferred examples are e.g. substituted maleates and citraconates, most preferably citraconates.

In emulsion method, the two phase liquid-liquid system may be formed by simple stirring and optionally adding (further) solvent(s) and additives, such as the turbulence minimizing agent (TMA) and/or the emulsifying agents and/or emulsion stabilizers, like surfactants, which are used in a manner known in the art for facilitating the formation of and/or stabilize the emulsion. Preferably, surfactants are acrylic or methacrylic polymers. Particular preferred are unbranched $C_{12}$ to $C_{20}$ (meth)acrylates such as poly(hexadecyl)-methacrylate and poly(octadecyl)-methacrylate and mixtures thereof. Turbulence minimizing agent (TMA), if used, is preferably selected from α-olefin polymers of α-olefin monomers with 6 to 20 carbon atoms, like polyoctene, polynonene, polydecene, polyundecene or polydodecene or mixtures thereof. Most preferable it is polydecene.

The solid particulate product obtained by precipitation or emulsion-solidification method may be washed at least once, preferably at least twice, most preferably at least three times with a aromatic and/or aliphatic hydrocarbons, preferably with toluene, heptane or pentane. The catalyst can further be dried, as by evaporation or flushing with nitrogen, or it can be slurried to an oily liquid without any drying step.

The finally obtained "non-phthalic" Ziegler-Natta procatalyst is desirably in the form of particles having generally an average particle size range of 5 to 200 µm, preferably 10 to 100. Particles are compact with low porosity and have surface area below 20 g/m², more preferably below 10 g/m². Typically, the amount of Ti is 1 to 6 wt.-%, Mg 10 to 20 wt.-% and donor 10 to 40 wt.-% of the catalyst composition.

Detailed description of preparation of catalysts is disclosed in WO 2012/007430, EP 2 610 271 and EP 2 610 272 which are incorporated here by reference.

The "phthalic" Ziegler-Natta procatalyst is prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

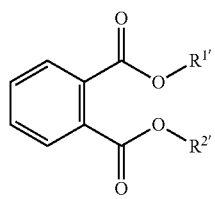

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The "phthalic" Ziegler-Natta procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanized carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

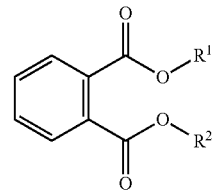

(II)

with $R^1$ and $R^2$ being methyl or ethyl, preferably ethyl,
the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the "phthalic" Ziegler-Natta procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the "phthalic" Ziegler-Natta procatalyst used according to the invention has been produced by using ethanol as the alcohol and dioctylphthalate (DOP) as dialkylphthalate of formula (I), yielding diethyl phthalate (DEP) as the internal donor compound.

Still more preferably the "phthalic" Ziegler-Natta procatalyst used according to the invention is the catalyst as described in the example section; especially with the use of dioctylphthalate as dialkylphthalate of formula (I).

For the production of the heterophasic propylene copolymer (HECO) according to the invention the catalyst system used preferably comprises in addition to the special Ziegler-Natta procatalyst ("non-phthalic" or "phthalic") an organometallic cocatalyst as component (ii).

Accordingly, it is preferred to select the cocatalyst from the group consisting of trialkylaluminium, like triethylaluminium (TEA), dialkyl aluminium chloride and alkyl aluminium sesquichloride. Triethylaluminium (TEA) is particularly preferred.

Component (iii) of the catalysts system used is an external donor represented by formula (IIIa) or (IIIb). Formula (IIIa) is defined by $$Si(OCH_3)_2R_2^5 \quad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by $$Si(OCH_2CH_3)_3(NR^xR^y) \quad (IIIb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor is of formula (IIIa), like dicyclopentyl dimethoxy silane [$Si(OCH_3)_2(cyclo-pentyl)_2$], diisopropyl dimethoxy silane [$Si(OCH_3)_2(CH(CH_3)_2)_2$].

Most preferably the external donor is dicyclopentyl dimethoxy silane [$Si(OCH_3)_2(cyclo-pentyl)_2$] (D-donor).

In a further embodiment, the Ziegler-Natta procatalyst can be modified by polymerising a vinyl compound in the presence of the catalyst system, comprising the special Ziegler-Natta procatalyst (component (i)), an external donor (component (iii)) and optionally a cocatalyst (component (iii)), which vinyl compound has the formula:

$$CH_2=CH-CHR^3R^4$$

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic propylene copolymer (HECO) according to this invention. The polymerized vinyl compound can act as an α-nucleating agent.

Preferred vinyl monomers for the preparation of a polymeric nucleating agent to be used in accordance with the present invention are in particular vinyl cycloalkanes, in particular vinyl cyclohexane (VCH), vinyl cyclopentane, and vinyl-2-methyl cyclohexane, 3-methyl-1-butene, 3-ethyl-1-hexene, 3-methyl-1-pentene, 4-methyl-1-pentene or mixtures thereof.

It is especially preferred that the polymeric nucleating agent is selected from the group of polyvinylalkanes or polyvinylcycloalkanes, in particular polyvinylcyclohexane (polyVCH), polyvinylcyclopentane, polyvinyl-2-methyl cyclohexane, poly-3-methyl-1-butene, poly-3-ethyl-1-hexene, poly-4-methyl-1-pentene, polystyrene, poly-p-methylstyrene, polyvinylnorbornane or mixtures thereof. The most preferred compound is polyvinylcyclohexane (polyVCH).

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

The Additives (AD)

As mentioned above the composition according to this invention must comprise a recycled polymer composition (RPC) and a heterophasic propylene copolymer (HECO) and may comprise additional additives (AD). However the recycled polymer composition (RPC) and the heterophasic propylene copolymer (HECO), respectively, may itself already contain additives. Thus when talking about "additives (AD)" according to this invention, additives are meant which are added in addition to those already present in the recycled polymer composition (RPC) and the heterophasic propylene copolymer (HECO), respectively.

Typical additives (AD) are alpha-nucleating agents (especially those as defined under the section "heterophasic propylene copolymer (HECO)"), stabilizers such as UV-stabilisers, hindered amine stabilisers (HALS), process stabilisers such as phosphites, long term stabilisers such as thiosynergists and phenolic antioxidants, alkyl radical scavengers, lubricants, processing aids, pigments and foaming agents. Such additives are commercially available and for example described in "Plastic Additives Handbook", 6$^{th}$ edition 2009 of Hans Zweifel (pages 1141 to 1190).

Furthermore, the term "additives" according to the present invention also includes carrier materials, in particular polymeric carrier materials, in which the active additives may be dispersed. That is, according to this invention "additives" cover also master batches which contain a polymeric carrier material, like polypropylene, and the active additives mentioned in the previous paragraph.

The amount of additives (AD) is indicated above where discussing the composition of the present invention.

The Pipe

In a further embodiment the invention is directed to a pipe comprising at least 90 wt.-%, more preferably at least 95 wt.-%, based on the weight of the pipe, of the composition according to this invention. In an especially preferred embodiment the pipe consists of the composition according to this invention.

The present invention is also concerned with a pipe according to the invention characterized in that the pipe has a pressure test performance measured according to ISO 1167 of more than 1000 h under a stress level of 2.5 MPa and at a temperature of 95° C.

The invention further provides a process for producing a pipe according to the invention comprising the steps of:
 a) optionally preparing the composition according to this invention
 and
 b) extruding said composition to a form of a pipe.

The pipe according to the invention is generally produced according to the methods known in the art. Thus, according to one preferred method the inventive composition is extruded through an annular die to a desired internal diameter, after which the inventive composition is cooled down.

The extruder preferably operates at a relatively low temperature and therefore excessive heat build-up should be avoided. Extruders having a high length to diameter ratio L/D more than 15, preferably of at least 20 and in particular of at least 25 are preferred. The modern extruders typically have an L/D ratio of from about 30 to 35.

The polymer melt is extruded through an annular die, which may be arranged either as end-fed or side-fed configuration. The side-fed dies are often mounted with their axis parallel to that of the extruder, requiring a right-angle turn in the connection to the extruder. The advantage of side-fed dies is that the mandrel can be extended through the die and this allows, for instance, easy access for cooling water piping to the mandrel.

After the plastic melt leaves the die it is calibrated to the correct diameter. In one method the extrudate is directed into a metal tube (calibration sleeve). Vacuum pressure is applied in the outside of the extrudate so that the plastic is pressed against the wall of the tube.

According to another method the extrudate leaving the die is directed into a tube having a perforated section in the center. A slight vacuum is drawn through the perforation to hold the pipe against the walls of the sizing chamber.

After the sizing the pipe is cooled, typically in a water bath having a length of about 5 meters or more.

The Use

As mentioned above the present invention is also directed to the use of the heterophasic propylene copolymer (HECO) as defined in the present invention as compatibilizer for a recycled polymer composition (RPC) in a pipe.

Thus the present invention is especially directed to the use of a heterophasic propylene copolymer (HECO) as compatibilizer for a recycled polymer composition (RPC) in a pipe, wherein
 (a) said heterophasic propylene copolymer (HECO) has
  (a1) a xylene cold soluble (XCS) fraction determined at 25° C. according to ISO 16152 in the range of 9 to 18 wt.-%, and
  (a2) a melt flow rate $MFR_2$ (230° C./2.16 kg) measured according to ISO 1133 in the range of 0.05 to 1.5 g/10 min,
 and
 (b) the recycled polymer composition (RPC) comprises at least 80 wt.-%, based on the weight of the recycled polymer composition (RPC), of a recycled polypropylene,
wherein further said heterophasic propylene copolymer (HECO), said recycled polymer composition (RPC) and optional additives (AD) are blended to form a composition being part of the pipe,
wherein still further
 (c) the weight ratio between the heterophasic propylene copolymer (HECO) and the recycled polymer composition (RPC) [(HECO)/(RPC)] is in the range of 1.1 to 7.0, and
 (d) the percentage by weight of the heterophasic propylene copolymer (HECO) together with the recycled polymer composition (RPC) [(HECO)+(RPC)], based on the weight of the composition, is at least 85 wt.-%.

Preferably the heterophasic propylene copolymer (HECO), the recycled polymer composition (RPC) and optional additives (AD) are used in a form of a composition, especially in a form of a composition as defined in the present invention.

Thus regarding preferred embodiments regarding the amounts of the components in the composition according to this invention reference is made to the information provided above. Also regarding the preferred embodiments of the individual components of the composition reference is made to the information provided above.

In the following the invention is described by way of preferred examples.

EXAMPLES

Measuring Methods

The following definitions of terms and determination methods apply for the above general description of the invention as well as to the below examples unless otherwise defined. Melt flow rate $MFR_2$ (230° C./2.16 kg) was determined according to ISO 1133 at a load of 2.16 kg at 230° C.

Quantification of Microstructure by NMR Spectroscopy

Quantitative nuclear-magnetic resonance (NMR) spectroscopy was used to quantify the comonomer content and comonomer sequence distribution of the polymers. Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

For polypropylene homopolymers all chemical shifts are internally referenced to the methyl isotactic pentad (mmmm) at 21.85 ppm.

Characteristic signals corresponding to regio defects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically the influence of regio defects and comonomer on the quantification of the tacticity distribution was corrected for by subtraction of representative regio defect and comonomer integrals from the specific integral regions of the stereo sequences.

The isotacticity was determined at the pentad level and reported as the percentage of isotactic pentad (mmmm) sequences with respect to all pentad sequences:

[mmmm]%=100*(mmmm/sum of all pentads)

The presence of 2,1 erythro regio defects was indicated by the presence of the two methyl sites at 17.7 and 17.2 ppm and confirmed by other characteristic sites.

Characteristic signals corresponding to other types of regio defects were not observed (Resconi, L., Cavallo, L., Fait, A., Piemontesi, F., Chem. Rev. 2000, 100, 1253).

The amount of 2,1 erythro regio defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{12e}$

The total amount of propene was quantified as the sum of primary inserted propene and all other present regio defects:

$P_{total}=P_{12}+P_{21e}$

The mole percent of 2,1 erythro regio defects was quantified with respect to all propene:

$[21e]$ mol $\%=100*(P_{21e}/P_{total})$

For copolymers characteristic signals corresponding to the incorporation of ethylene were observed (Cheng, H. N., Macromolecules 17 (1984), 1950).

With regio defects also observed (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) correction for the influence of such defects on the comonomer content was required.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$E=0.5(S\beta\beta+S\beta\gamma+S\beta\delta+0.5(S\alpha\beta+S\alpha\gamma))$

Through the use of this set of sites the corresponding integral equation becomes:

$E=0.5(I_H+I_G+0.5(I_C+I_D))$ using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$E[\text{mol }\%]=100*fE$

The weight percent comonomer incorporation was calculated from the mole fraction:

$E[\text{wt }\%]=100*(fE*28.06)/((fF*28.06)+((1-fE)*42.08))$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

Limonene Quantification was Carried Out Using Solid Phase Microextraction (HS-SPME-GC-MS) by Standard Addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase microextraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time
Total Free Fatty Acid Content Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 μL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:
Column: 20 m ZB Wax plus 0.25*0.25
Injector: Split 5:1 with glass lined split liner, 250° C.
Temperature program: 40° C. (1 min) @6° C./min to 120° C., @15° C. to 245° C. (5 min)
Carrier: Helium 5.0, 40 cm/s linear velocity, constant flow
MS: Single quadrupole, direct interface, 220° C. inter face temperature
Acquisition: SIM scan mode
Scan parameter: 46-250 amu 6.6 scans/s
SIM Parameter: m/z 60.74, 6.6 scans/s
FTIR-Spectroscopy
Determination of the components and their amount in the recycled polymer composition is accomplished by FTIR-spectroscopy:
Resolution: 2 cm$^{-1}$
Layer thickness of compression molded specimen: ca. 100 μm
Apodisation: strong
Method: transmission
Polypropylene: 1167 cm$^{-1}$
Polystyrene: 1601.5 cm$^{-1}$
Polyamide: 3300 cm$^{-1}$
Talc: 3676 cm$^{-1}$
Chalk: 1797 cm$^{-1}$
Rest to 100 wt.-% is polyethylene Charpy notched impact strength was determined according to ISO 179 1eA at 23° C. using 80×10×4 mm$^3$ test bars injection molded in line with EN ISO 1873-2.

Tensile Modulus was determined according to ISO 527-2 (cross head speed=50 mm/min; 23° C.) using injection molded specimens as described in EN ISO 1873-2 (dog bone shape, 4 mm thickness).

Density of the polymer was determined according to ISO 1183-1:2004 method A on compression moulded specimen prepared according to EN ISO 1872-2 (February 2007) and is given in g/cm$^3$.

Xylene cold solubles (XCS) content was determined at 25° C. according ISO 16152; first edition; 2005 Jul. 1.

Intrinsic viscosity (IV) was determined according to DIN ISO 1628/1, October 1999 (in decalin at 135° C.).

Heat deflection temperature (HDT) was determined according to ISO 75 A with a load of 1.8 MPa using 80×10×4 mm$^3$ test bars injection molded in line with EN ISO 1873-2.

The oxidation induction time (OIT) at 200° C. was determined with a TA Instrument Q20 according to ISO11357-6. Calibration of the instrument was performed with Indium and Tin, according to ISO 11357-1. Each polymer sample (cylindrical geometry with a diameter of 5 mm and thickness of 0.5±0.05 mm) was placed in an open aluminium crucible, heated from 25° C. to 200° C. at a rate of 20° C. min$^{-1}$ in nitrogen with a gas flow rate of 50 mL min$^{-1}$, and allowed to rest for 5 min before the atmosphere was switched to oxygen, also at a flow rate of 50 mL min$^{-1}$. The samples were maintained at constant temperature, and the exothermal heat associated with oxidation was recorded. The oxidation induction time was the time interval between the initiation of oxygen flow and the onset of the oxidative reaction.

Pipe Pressure Test

Pressure test performance was measured according to ISO 1167. In this test, a specimen is exposed to constant circumferential (hoop) stress of 2.5 MPa at elevated temperature of 95° C. in water-in-water. The time in hours to failure is recorded. The tests were performed on pipes produced on conventional pipe extrusion equipment, the pipes having a diameter of 110 mm and a wall thickness of 4 mm.

FNCT (full notch creep test) is determined according ISO 16770. The test specimens are compression moulded plates (thickness 10 mm). The test specimens are stressed in an aqueous solution at 80° C. and 4 MPa. For each sample 3 specimens are tested. The average value of the three measurements are used to report the time in hours.

Falling Weight Impact Testing at −10° C.

For practical testing of the impact resistance, the pipes were subjected to external blows by the staircase method according to EN 1411. In this test, a series of pipes were conditioned at −10° C. and subjected to a hammer with a falling from different heights. As a result, $H_{50}$ [=mm] indicates the height, at which 50% of the pipes fail.

Conditioning Temperature: −10° C.; Conditioning Period: 60 min; Conditioning: in air;

Striker: d25; Weight: 10 kg.

Ring stiffness tests have been performed according to ISO 9969 at +23° C. on pipes having a diameter of 110 mm and a wall thickness of 4 mm.

EXAMPLES

A number of blends were produced with DIPOLEN PP, a polypropylene-rich recycled plastic material (from Mtm Plastics GmbH, material according to the February 2014 specification) as the recycled polymer composition (RCP). In each of the blends 15 to 40 wt.-% of a heterophasic propylene copolymer (HECO) as compatibilizer was added.

The compositions were prepared via melt blending on a co-rotating twin screw extruder. The polymer melt mixture was discharged and pelletized.

In the following the used components are specified in more detail:

Recycled Polymer Composition (RCP): DIPOLEN PP

TABLE 1

| Composition of Dipolen PP | |
|---|---|
| Dipolen PP | [wt.-%][1] |
| polypropylene | 93 |
| polyethylene | 4.5 |
| Polystyrene | 1.0 |
| Polyamide | 0.2 |
| Talc, chalk | 1.3 |

[1]The concentration of the components has been measured by IR spectroscopy;

TABLE 2

Limonene content in DIPOLEN PP

| Sample | Limonen [mg/kg] HS-SPME-GC-MS[1] |
|---|---|
| Dipolen PP | 20.6 ± 1.7 |

[1]Headspace Solidphase Microextraction. Material available from mtm plastics GmbH, according to 2018 specification.

TABLE 3

Total fatty acid content in Dipolen PP

| Sample | Limonen [mg/kg] HS-SPME-GC-MS[1] |
|---|---|
| Dipolen PP | 35.7 mg/kg |

[1]The concentration of acetic acid, propionic acid, butyric acid, pentanoic acid, hexanoic acid, octanoic acid, nonanoic acid and decanoic acid in each sample was added together to give a total fatty acid concentration value.

Heterophasic Propylene Copolymer (HECO)
Preparation of the Catalyst

First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of diethylhexylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP 491 566, EP 591 224 and EP 586 390.

For the preparation of the HECO as indicated below triethylaluminium (TEAL), dicyclopentyldimethoxysilane (D-donor), catalyst as produced above and vinyl cyclohexane (VCH) were added into oil, like mineral oil, e.g. Technol 68 (kinematic viscosity at 40° C. 62-74 cSt), in amounts so that TEAL/Ti was 125 mol/mol, TEAL/D donor was 5 mol/mol, and weight ratio of VCH/solid catalyst was 1:1. The mixture was heated to 60-65° C. and allowed to react until the content of the unreacted vinylcyclohexane in the reaction mixture was ~150 ppm. Catalyst concentration in the final oil-catalyst slurry was 10-20 wt-%.

TABLE 4

Polymerization conditions for heterophasic propylene copolymer (HECO)

| | Unit | HECO |
|---|---|---|
| Loop | | |
| Temperature | [° C.] | 85 |
| Pressure | [kPa] | 5500 |
| $H_2/C_3$ ratio | [mol/kmol] | 0.08 |
| $MFR_2$ | [g/10 min] | 0.05 |
| C2 | [wt.-%] | 0 |
| Split | [wt.-%] | 46 |
| GPR 1 | | |
| Temperature | [° C.] | 90 |
| Pressure | [kPa] | 2500 |
| $H_2/C_3$ ratio | [mol/kmol] | 214 |
| $MFR_2$ | [g/10 min] | 0.30 |
| XCS | [wt.-%] | 1.5 |
| C2 | [wt.-%] | 0 |
| Split | [wt.-%] | 40 |
| GPR 2 | | |
| Temperature | [° C.] | 80 |
| Pressure | [kPa] | 2000 |
| $H_2/C_2$ ratio | [mol/kmol] | 20 |
| $C_2/C_3$ ratio | [mol/kmol] | 550 |
| $MFR_2$ | [g/10 min] | 0.25 |
| XCS | [wt.-%] | 11 |
| C2 of XCS | [wt.-%] | 33 |
| IV of XCS | [dl/g] | 3.5 |
| C2 total | [wt.-%] | 5.1 |
| Split | [wt.-%] | 14 |

C2 ethylene
IV intrinsic viscosity
XCS xylene cold soluble fraction
$H_2/C_3$ ratio hydrogen/propylene ratio
$C_2/C_3$ ratio ethylene/propylene ratio
Loop Loop reactor
½ GPR ½ gas phase reactor The heterophasic propylene copolymer (HECO) has been melt mixed with 0.1 wt.-% Irgafos 168, 0.15 wt.-% Irganox 1010 and 0.2 wt.-% Irganox PS802.

TABLE 5

Properties of the compositions

| | | CE1 | IE1 | IE2 | IE3 |
|---|---|---|---|---|---|
| DIPOLEN PP | [wt.-%] | 100 | 15 | 25 | 40 |
| HECO | [wt.-%] | — | 85 | 75 | 60 |
| $MFR_2$ | [g/10 min] | 13 | 0.6 | 0.75 | 1.2 |
| Tensile modulus | [MPa] | 1280 | 1530 | 1446 | 1400 |
| Charpy notched impact [23° C.] | [kJ/m$^2$] | 5.2 | 34.5 | 19.9 | 10.9 |
| HDT | [° C.] | — | 55.4 | 54 | 53 |
| OIT | [min] | <3 | 54 | 33 | 21 |

Pipes were produced as follows:
The compositions of table 5 were extruded into solid wall pipes in the following way:
External diameter: 110 mm
Wall thickness: 4 mm
Extruder was a single screw extruder of Kraus Maffei 36D with screw diameter of 45 mm
Temperature profile: Barrel zones: 220/220/215/210/210° C.;
120 kg/hr; line speed 1.56 m/min

TABLE 6

Properties of the pipes

| | | IE1 | IE2 | IE3 |
|---|---|---|---|---|
| Pipe pressure test 95° C.; 2.5 MPa | [hrs] | 1960 | 1900 | 900 |
| Ring stiffness | [kN/m$^2$] | 8.9 | 7.8 | 7.5 |
| Falling weight staircase | [mm] | 2610 | 2480 | 2180 |

The invention claimed is:
1. A composition comprising a recycled polymer composition (RPC) and a heterophasic propylene copolymer (HECO), the composition is obtained by blending, wherein
(a) the recycled polymer composition (RPC) comprises at least 80 wt.-%, based on the weight of the recycled polymer composition (RPC), of a recycled polypropylene, and
(b) the heterophasic propylene copolymer (HECO) has
(b1) a xylene cold soluble (XCS) fraction determined at 25° C. according to ISO 16152 in the range of 5.0 to 18 wt.-%, and
(b2) a melt flow rate $MFR_2$ (230° C./2.16 kg) measured according to ISO 1133 in the range of 0.05 to 1.5 g/10 min,
wherein further
(a) the weight ratio between the heterophasic propylene copolymer (HECO) and the recycled polymer composition (RPC) [(HECO)/(RPC)] is in the range of 1.1 to 7.0,
(b) the percentage by weight of the heterophasic propylene copolymer (HECO) together with the recycled polymer composition (RPC) [(HECO)+(RPC)], based on the weight of the composition, is at least 85 wt.-%, and
(c) the composition has a tensile modulus measured according to ISO 527-2 in the range of 1100 to 1600 MPa and/or a content of limonene as determined using solid phase microextraction (HS-SPME-GC-MS) of from 0.5 to 40 mg/kg.

2. The composition according to claim 1 consisting of the recycled polymer composition (RPC), the heterophasic propylene copolymer (HECO) and optional additives (AD).

3. The composition according to claim 2, wherein:
(a) the percentage by weight of the heterophasic propylene copolymer (HECO) together with the recycled polymer composition (RPC) [(HECO)+(RPC)], based on the weight of the composition, is at least 90 wt.-%, and
(b) the remaining part up to 100 wt.-%, based on the weight of the composition are additives (AD).

4. The composition according to claim 1, wherein the composition has a melt flow rate $MFR_2$ (230° C./2.16 kg) measured according to ISO 1133 in the range of 0.05 to 2.0 g/10 min.

5. The composition according to claim 1, wherein the recycled polymer composition (RPC) has
(a) a content of limonene determined by using solid phase microextraction (HS-SPME-GC-MS) of from 5 to 100 mg/kg;
and/or
(b) a total fatty acid content determined by using solid phase microextraction (HS-SPME-GC-MS) of from 20 to 100 mg/kg.

6. The composition according to claim 1, wherein the recycled polymer composition (RPC) additionally comprises minor amounts of recycled polyethylene, recycled polystyrene, recycled polyamide and inorganic compounds selected from the group consisting of talc, chalk and mixtures thereof,
with the proviso that the amounts are as follows:
(a) not more than 15.0 wt.-%, based on the weight of the recycled polymer composition (RPC), of recycled polyethylene;
(b) not more than 8.00 wt.-%, based on the weight of the recycled polymer composition (RPC), of recycled polystyrene;
(c) not more than 1.50 wt.-%, based on the weight of the recycled polymer composition (RPC), of recycled polyamide; and
(d) not more than 2.50 wt.-% based on the weight of the recycled polymer composition (RPC), of inorganic components selected from the group consisting of talc, Chalk, and mixtures thereof.

7. The composition according to claim 1, wherein the heterophasic propylene copolymer (HECO) contains only propylene and ethylene derived units, wherein further
(a) the heterophasic propylene copolymer (HECO) has an ethylene content determined by $^{13}C$-NMR spectroscopy in the range of 3.0 to 8.0 wt.-%, and/or
(b) the ethylene content of the xylene cold soluble (XCS) fraction of the heterophasic propylene copolymer (HECO) determined by $^{13}C$-NMR spectroscopy is in the range of 30 to 36 wt.-%.

8. The composition according to claim 1, wherein the intrinsic viscosity determined according to DIN ISO 1628/1 (in decalin at 135° C.) of the xylene cold soluble (XCS) fraction of the heterophasic propylene copolymer (HECO) is in the range of 2.9 to 4.5 dl/g.

9. The composition according to claim 1, wherein the heterophasic propylene copolymer (HECO) comprises a semicrystalline propylene homopolymer (PPH) as matrix in which a propylene-ethylene rubber as elastomeric propylene copolymer (EPC) is dispersed.

10. The composition according to claim 9, wherein the semicrystalline propylene homopolymer (PPH) has a melt flow rate $MFR_2$ (230 C/2.16 kg) measured according to ISO 1133 in the range of 0.05 to 1.5 g/10 min.

11. The composition according to claim 9, wherein the semicrystalline polypropylene (PPH) comprises two semicrystalline propylene homopolymer fractions (PPH1) and (PPH2),
wherein
(a) the percentage by weight of the two semicrystalline propylene homopolymer fractions (PPH1) and (PPH2) together ((PPH1)+(PPH2)), based on the weight of the semicrystalline propylene homopolymer (PPH), is at least 90 wt.-%;
and
(b) weight ratio between the two semicrystalline propylene homopolymer fractions (PPH1) and (PPH2) ((PPH1)/(PPH2)) is in the range of 0.8 to 1.4;
wherein further
(c) the semicrystalline propylene homopolymer fraction (PPH1) has a melt flow rate $MFR_2$ (230° C./2.16 kg) measured according to ISO 1133 in the range of 0.01 to 1.0 g/10 min;
and
(d) the semicrystalline propylene homopolymer (PPH) has a melt flow rate $MFR_2$ (230° C./2.16 kg) measured according to ISO 1133 in the range of 0.05 to 2.0 g/10 min.

12. The composition according to claim 11, wherein the melt flow rate MFR2 ratio of the semicrystalline propylene homopolymer (PPH) to the semicrystalline propylene homopolymer fraction (PPH1) (MFR2 (PPH)/MFR2 (PPH1)) is at least 3.

13. The composition according to claim 1, wherein the heterophasic propylene copolymer (HECO) is alpha-nucleated.

14. A process for producing a composition according to claim 1, wherein the heterophasic propylene copolymer (HECO), the recycled polymer composition (RPC) and any optional additives (AD) are mixed, obtaining thereby the composition.

15. A pipe comprising at least 90 wt.-%, based on the weight of the pipe, of a composition according to claim 1.

16. The composition according to claim 1, wherein the recycled polymer composition (RPC) has a melt flow rate MFR$_2$ (230° C./2.16 kg) measured according to ISO 1133 of at least 8.0 g/10 min.

\* \* \* \* \*